D. Johnston,
Hand Rake.
No. 94,118. Patented Aug. 24, 1869.
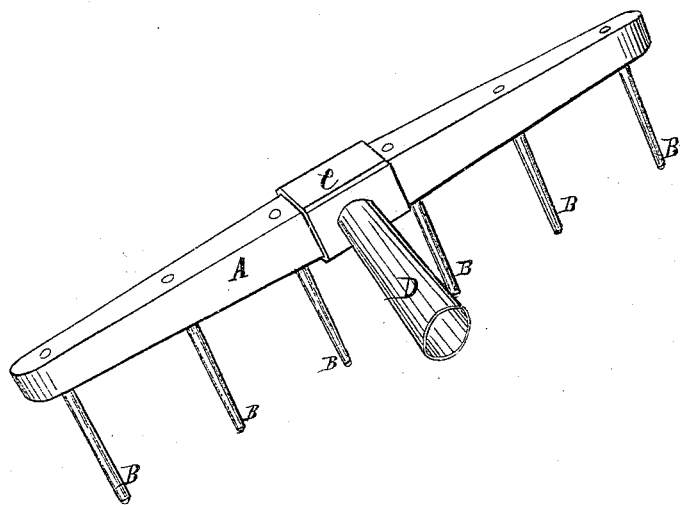
Witnesses
Harry King
Leopold Evert
Inventor.
Davd. Johnston

United States Patent Office.

DANIEL JOHNSTON, OF SULPHUR SPRINGS, OHIO.

Letters Patent No. 94,118, dated August 24, 1869.

IMPROVEMENT IN HAND-RAKES.

The Schedule referred to in these Letters Patent and making part of the same.

*To all whom it may concern:*

Be it known that I, DANIEL JOHNSTON, of Sulphur Springs, in the county of Crawford, and in the State of Ohio, have invented a certain new and useful Improvement in Hand-Rakes; and do hereby declare that the following is a full, clear, and exact description thereof, reference being had to the accompanying drawings, and to the letters of reference marked thereon.

The nature of my invention consists in a malleable clamp by which the head and handle of a hand-rake are connected and can be removed at will and replaced, by which the rake is made much less liable to break than the common rake where the head is bored and handle passing through. It also dispenses with the necessity for bows, as in the common rake.

In order to enable others skilled in the art to which my invention appertains to make and use the same, I will now proceed to describe its construction and operation, referring to the annexed drawings, which form a part of this specification, and which are a perspective view of my invention.

A represents the head of a hand-rake, in which the teeth B B are inserted.

Before the teeth are inserted into the head A, I place a clamp, C, around the middle of the same.

This clamp, which is held in its proper place by the two centre teeth, is provided with a socket, D, in which the handle of the rake is placed.

By this means the handle can be easily removed and replaced, and the head being solid, the rake is not so liable to be broken as the ordinary rakes.

Having thus fully described my invention,

What I claim as new, and desire to secure by Letters Patent, is—

The combination of the head A and teeth B B with the clamp C and socket D, all constructed and arranged substantially as shown and described.

In testimony that I claim the foregoing, I have hereunto set my hand, this 1st day of September, 1868.

DANIEL JOHNSTON.

Witnesses:
   ROBERT LYSLE,
   C. L. EVERT.